(12) United States Patent
Sa (10) Patent No.: US 8,031,236 B2
(45) Date of Patent: Oct. 4, 2011

(54) WHITE DETECTING METHOD AND APPARATUS USING THE SAME

(75) Inventor: Seok-woon Sa, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 11/979,489

(22) Filed: Nov. 5, 2007

(65) Prior Publication Data

US 2008/0117308 A1    May 22, 2008

(30) Foreign Application Priority Data

Nov. 21, 2006  (KR) .................. 10-2006-0115271
Apr. 25, 2007  (KR) .................. 10-2007-0040292

(51) Int. Cl.
*H04N 9/73*    (2006.01)
*H04N 5/228*   (2006.01)

(52) U.S. Cl. .................. 348/223.1; 348/222.1

(58) Field of Classification Search ............ 348/223.1, 348/225.1, 229.1
See application file for complete search history.

(56) References Cited

U.S. PATENT DOCUMENTS

| 5,659,357 | A | * | 8/1997 | Miyano | 348/223.1 |
| 7,636,108 | B2 | * | 12/2009 | Suzuki et al. | 348/223.1 |
| 7,804,525 | B2 | * | 9/2010 | Subbotin | 348/223.1 |
| 2002/0018129 | A1 | * | 2/2002 | Ikeda | 348/223 |
| 2004/0196383 | A1 | * | 10/2004 | Suzuki et al. | 348/223.1 |
| 2006/0007324 | A1 | * | 1/2006 | Takei | 348/223.1 |

FOREIGN PATENT DOCUMENTS

| JP | 03-274884 | 12/1991 |
| KR | 1994-001677 | 1/1994 |
| KR | 1998-036496 | 8/1998 |

* cited by examiner

*Primary Examiner* — Kelly L Jerabek
(74) *Attorney, Agent, or Firm* — Roylance, Abrams, Berdo and Goodman, LLP

(57) ABSTRACT

A white detecting method and apparatus using the same are disclosed, wherein the white detecting method includes steps for using a luminance division and/or using a window division for white detecting. The luminance division detects a white by using at least one color data information existing in a white area, and the window division detects a mean value of at least one color data information existing in the white area as a white. With this, the white which forms a reference in color correction, can be accurately detected, thereby improving a stability of color sense and reducing an error probability in white balancing.

12 Claims, 7 Drawing Sheets

WHITE DETECTING METHOD AND APPARATUS USING THE SAME

CROSS-REFERENCE TO RELATED APPLICATIONS

This application claims the benefit under 35 U.S.C. §119(a) of Korean Patent Application No. 10-2006-0115271, filed Nov. 21, 2006 and No. 10-2007-0040292, filed Apr. 25, 2007, in the Korean Intellectual Property Office, the entire disclosures of which are incorporated herein by reference.

BACKGROUND OF THE INVENTION

1. Field of the Invention

The present invention relates generally to a white detecting method and an apparatus using the same. More particularly, the present invention relates to a white detecting method which is used in performing a white balancing, and an apparatus using the same.

2. Description of the Related Art

Generally, even though an imaging apparatus, such as a digital still camera, digital video camera or the like, photographs the same subject, an outward appearance of the color of the photographed subject is varied according to light sources of various conditions, such as solar light found outdoors, muted solar light as occurring on cloudy days, white color lamps as found indoors, fluorescent light, and so forth.

Also, the imaging apparatus faithfully responds to red (R), green (G), and blue (B), or (RGB) components included in the light sources, each of which has a different color temperature, so that it reproduces a blue-toned white if the color temperature is high and a red-toned white if the color temperature is low.

Accordingly, in such cases, there is a need for the blue-toned white and the red-toned white to be shown with pure white. Also, if the color temperature has been changed, it is preferable that a white balance is maintained at the changed color temperature. For this, in the case of an achromatic color subject, a ratio of RGB is controlled to be always maintained at a uniform value, or color difference signals R-Y and B-Y are controlled to be always maintained at zero. Performing such a function is called an adjustment of white balance or a white balancing.

To accurately perform the adjustment of white balance, there is a need to accurately detect a white which forms a reference. Such white detecting methods include one method which searches a luminance of the entire image, divides the searched luminance, receives data of B, R and G according to the respective divided luminances and then detects a most proximate white to a white area, and another method which divides an image into small windows, receives data of B, R and G, that is, color data, of the respective small windows, and then detects a white.

However, the method of using the luminance division may present a problem in that a high luminance of monochrome or the like is mixed in a color data detected as the white. In this case, if a color is corrected on the basis of the detected color data, an error probability is increased. Also, if a plurality of data of B, R and G having different ranges of luminance exist in an area adjacent to a luminance trace, the white is continuously varied, thereby resulting in an error during color correction and a small change in color sense.

Also, the method of using the window division may present a problem in that, since to perform the white balancing, a window most adjacent to a white trace is selected from among the large number of windows and this selected window is frequently changed, thus a minute change in color sense is frequently generated.

Accordingly, a need exists for a system and method for accurately detecting a white while also improving a stability of color sense and reducing an error probability.

SUMMARY OF THE INVENTION

An aspect of exemplary embodiments of the present invention is to solve at least the above problems and/or disadvantages and to provide at least the advantages described below. Accordingly, an aspect of exemplary embodiments of the present invention is to provide a white detecting method and an apparatus using the same capable of accurately detecting a white, which forms a reference in color correction, thereby improving a stability of color sense and reducing an error probability in color correction.

According to an aspect of an exemplary embodiment of the present invention, a white detecting method is provided for use in performing a white balancing comprising steps for deciding whether color data information exists in a white area, which is an area of predetermined range including a white trace, and detecting a white by using at least one color data information existing in the white area.

Preferably, but not necessarily, the deciding step comprises steps for deciding in which of the sub-white areas subdivided from the white area the color data information exists, and the detecting step comprises steps for detecting at least one color data information existing in a sub-white area subdivided from the white area, which is located within a minimum distance from the white trace, as the white.

Preferably, but not necessarily, when a plurality of color data information exists in the sub-white area, which is located within the minimum distance from the white trace, a color data information having a higher luminance out of the plurality of color data information is detected as the white.

Preferably, but not necessarily, intervals between the sub-white areas are uniform.

Preferably, but not necessarily, the deciding step comprises steps for deciding whether the color data information exists in the white area by measuring distances between the color data information and the white trace.

Preferably, but not necessarily, the color data information is color data information calculated from respective divided luminances.

Also, preferably, but not necessarily, the color data information is at least two of gain values of red (R), green (G) and blue (B) colors.

According to another aspect of an exemplary embodiment of the present invention, a photographing apparatus is provided comprising a storing unit to store color data information, and a control unit to decide whether color data information exists in a white area, which is an area of predetermined range including a white trace, and to detect a white by using at least one color data information existing in the white area, when detecting the white to perform a white balancing.

Preferably, but not necessarily, the control unit is configured to subdivide the white area into a plurality of sub-white areas to decide in which of the sub-white areas the color data information exists, and detect at least one color data information existing in a sub-white area subdivided from the white area, which is located within a minimum distance from the white trace, as the white.

Preferably, but not necessarily, when a plurality of color data information exists in the sub-white area, which is located within the minimum distance from the white trace, the control unit is configured to detect color data information having a higher luminance out of the plurality of color data information as the white.

Preferably, but not necessarily, intervals between the sub-white areas are uniform.

Preferably, but not necessarily, the control unit is configured to decide whether the color data information exists in the white area by measuring distances between the color data information and the white trace.

Preferably, but not necessarily, the color data information is color data information calculated from respective divided luminances.

Also, preferably, but not necessarily, the color data information is at least two of gain values of red (R), green (G) and blue (B) colors.

According to another aspect of an exemplary embodiment of the present invention, a white detecting method is provided for use in performing a white balancing comprising steps for deciding whether color data information exists in a white area, which is an area having a white obtained by using a white chart, and detecting a white by using at least one color data information existing in the white area.

Preferably, but not necessarily, the detecting step includes steps for detecting a mean value of a plurality of color data information as the white when the plurality of color data information exists in the white area.

Preferably, but not necessarily, the white area is a portion of areas divided into a subject area of white, which is an area of predetermined range including a white trace, and includes at least two of the divided areas.

Preferably, but not necessarily, the color data information is gain values of color data detected from divided windows.

Also, preferably, but not necessarily, the deciding step includes steps for deciding whether each of the gain values detected from the divided windows exists in the white area, and the detecting step includes steps for detecting a mean value of the gain values existing in the white area as the white.

According to still another aspect of an exemplary embodiment of the present invention, a photographing apparatus is provided comprising a storing unit to store color data information, and a white deciding unit to decide whether color data information exists in a white area, which is an area having a white obtained by using a white chart, and to detect a white by using at least one color data information existing in the white area, when detecting the white to perform a white balancing.

Preferably, but not necessarily, the white deciding unit is configured to detect a mean value of a plurality of color data information as the white when the plurality of color data information exists in the white area.

Preferably, but not necessarily, the white area is a portion of a plurality of areas divided into a subject area of white, which is an area of predetermined range including a white trace, and includes at least two of the divided areas.

Preferably, but not necessarily, the color data information is gain values of color data detected from divided windows.

Also, preferably, but not necessarily, the white deciding unit decides whether each of the gain values detected from the divided windows exists in the white area, and detects a mean value of the gain values existing in the white area as the white.

BRIEF DESCRIPTION OF THE DRAWING FIGURES

The above aspects and other features of the present invention will become more apparent by describing in detail exemplary embodiments thereof with reference to the attached drawing figures, wherein.

Throughout the drawings, the same drawing reference numerals will be understood to refer to the same elements, features, and structures.

DETAILED DESCRIPTION OF EXEMPLARY EMBODIMENTS

Hereinafter, a white detecting method and an apparatus using the same in accordance with exemplary embodiments of the present invention will be described in detail with reference to the accompanying drawing figures.

Figure 1:
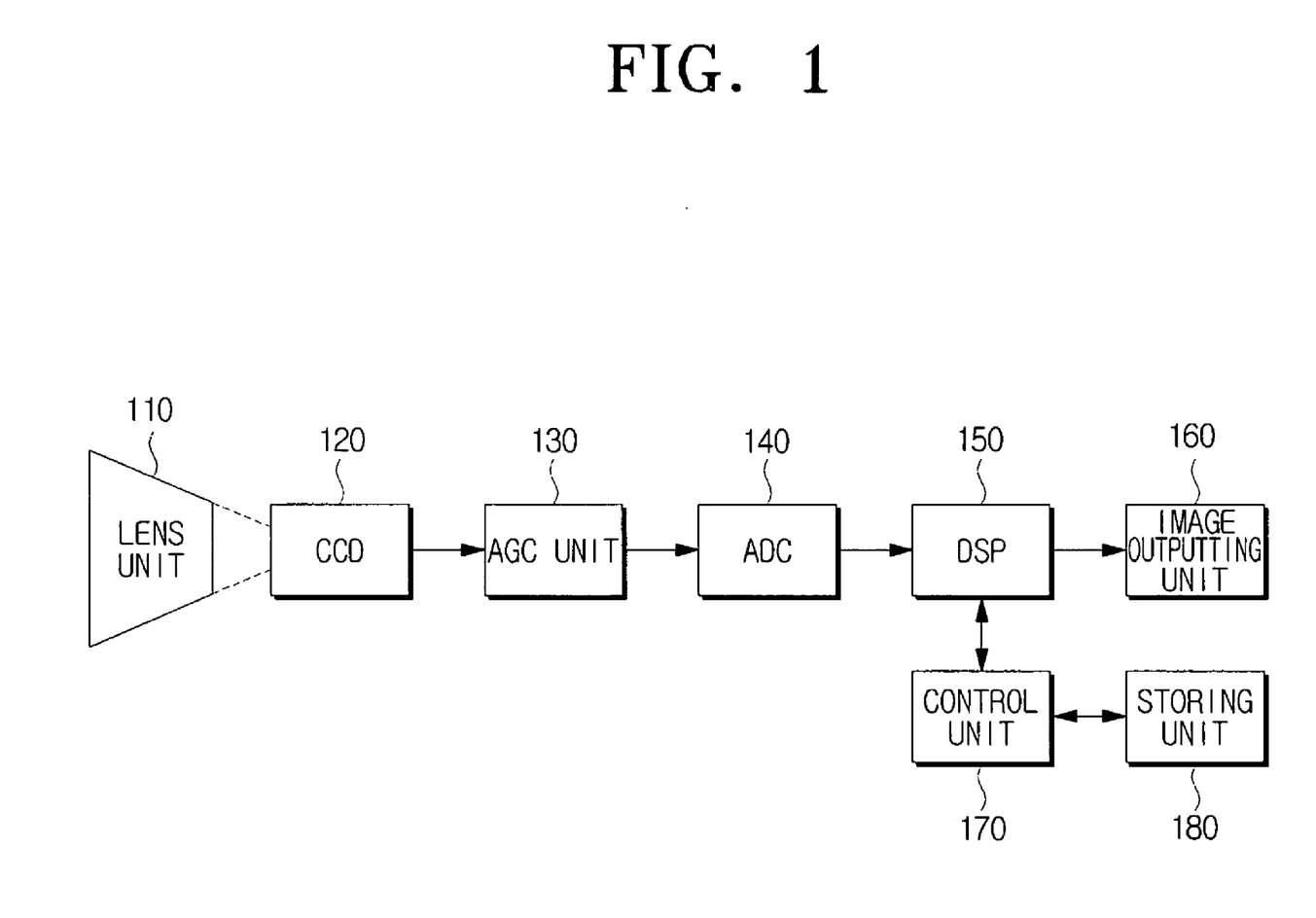
FIG. 1 is a block diagram exemplifying a digital camcorder to which embodiments of the present invention are applicable.

FIG. 1 is a block diagram exemplifying a digital camcorder to which embodiments of the present invention are applicable. As illustrated in FIG. 1, the digital camcorder comprises a lens unit 110, a charge-coupled device (CCD) 120, an automatic gain control (AGC) unit 130, an analog to digital converter (ADC) 140, a digital signal processor (DSP) 150, an image outputting unit 160, a control unit 170, and a storing unit 180.

The lens unit 110 is provided with a zoom lens to enlarge and reduce a ratio of a subject, a focus lens to focus on the subject, an iris to adjust an intensity of light, and so forth.

The CCD 120 is an imaging device which photoelectrically converts an image photographed through the lens unit 110 into electric signals. The CCD 120 outputs accumulated signals every frame period, that is, 1/30 second, or every field period, that is, 1/60 second. Besides the CCD 120, a complementary metal oxide semiconductor (CMOS) type imaging device may be used in embodying the digital camcorder.

The AGC unit 130 controls gains of the signals output from the CCD 120. The ADC 140 then converts the image signals of one field or one frame gain-adjusted by the AGC unit 130 into digital signals and outputs them to the DSP 150. The DSP 150 is provided with circuits for processing the digital-converted image signals in a predetermined format and for carrying out other desired signal processing. The image outputting unit 160 outputs the image, which is signal-processed by the DSP 150.

The control unit 170 controls general operations of the digital camcorder. Particularly, the control unit 170 performs a luminance search of the image signals received from the DSP 150. Namely, the control unit 170 searches luminances according to predetermined levels to calculate color data information, and stores the calculated color data information in the storing unit 180.

After storing the calculated color data information according to the predetermined levels, the control unit 170 reads out again color data information stored in the storing unit 180, and measures distances between the color data and a white trace to decide whether the color data information is included in a white area. The control unit 170 detects a white out of the color data information existing in the white area, calculates gain values of R (red) and B (blue) for adjusting a white balance by using the detected white, and transmits the calculated gain values to the DSP 150. The DSP 150 corrects the color data information by using the transmitted gain values of R and B, and outputs the color data information in which the white balance is adjusted.

Figure 2:
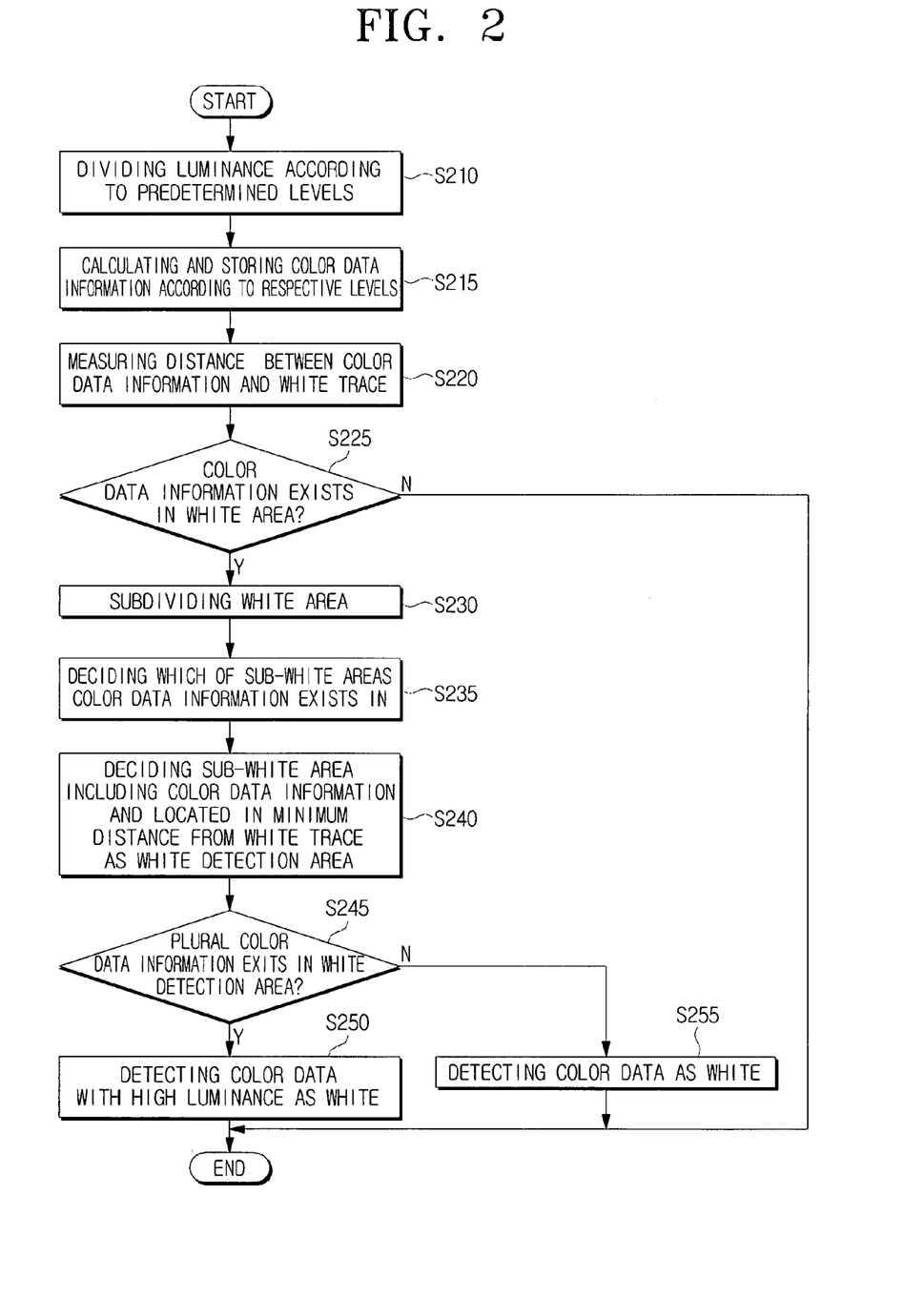
FIG. 2 is a flowchart exemplifying a method of detecting a color data existing in a white area as a white in accordance with an exemplary embodiment of the present invention.

Hereinafter, an exemplary method which can be implemented by the digital camcorder illustrated in FIG. 1 to detect the white in order to perform a white balancing, will now be described in detail with reference to FIG. 2. FIG. 2 is a flowchart exemplifying a method of detecting a color data existing in the white area as the white in accordance with an exemplary embodiment of the present invention. The exemplary method of the flowchart of FIG. 2 is preferably operated in a period of one field, but is not limited thereto.

Referring to FIG. 2, the control unit 170 divides a luminance according to predetermined levels at step (S210).

Specifically, the control unit 170 receives a luminance of a photographed image from the DSP 150. When the control unit 170 divides the luminance according to predetermined levels, the divided range and levels of luminance can be changed according to a user's setting and embodying ability of the apparatus.

Figure 3:
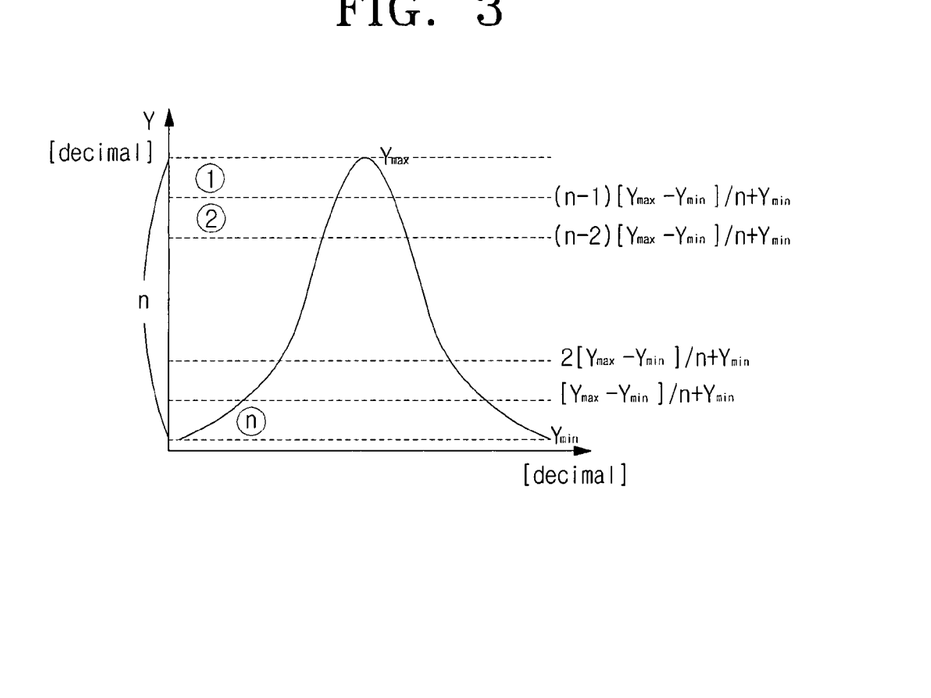
FIG. 3 is a graph exemplifying luminances divided according to predetermined levels in the white detecting method in accordance with an exemplary embodiment of the present invention.

FIG. 3 is a graph exemplifying luminances divided according to predetermined levels in an exemplary white detecting method. In the exemplary embodiment of the present invention, for explanatory convenience, it is assumed that as illustrated in FIG. 3, the divided range of luminance is $Y_{min}$ through $Y_{max}$ (along the vertical axis), the number of divided levels of luminance is n, and a magnitude of respective levels is $(Y_{max}-Y_{min})/n$. Thus, a range of luminance at an area ① is $(n-1)(Y_{max}-Y_{min})/n+Y_{min}$ through $Y_{max}$, and a range of luminance at an area ② is $(n-2)(Y_{max}-Y_{min})/n+Y_{min}$ through $(n-1)(Y_{max}-Y_{min})/n+Y_{min}$. Additional areas ④, ⑤ and so forth, can be established in a similar manner.

The control unit 170 calculates color data information corresponding to the respective levels of the entire image, and stores the calculated color data information in the storing unit 180 at step (S215). The color data information may include gain values of red (R), green (G), and blue (B), or for example, only gain values of R and B. In addition, the color data information may be color data itself.

Figure 4:
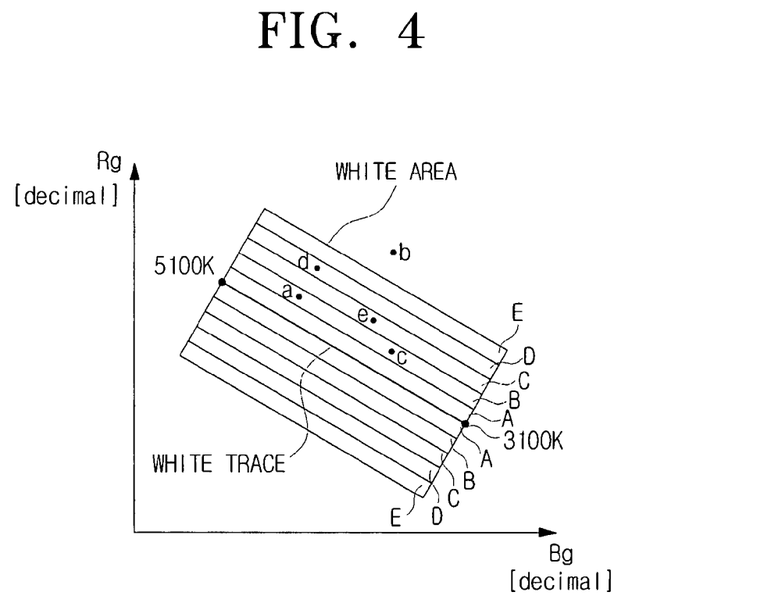
FIG. 4 is a graph exemplifying color data distributed centering on a white trace in the white detecting method in accordance with an exemplary embodiment of the present invention.

After storing the color data information corresponding to the respective levels, the control unit 170 measures distances between the stored color data information and a white trace at step (S220). As illustrated in FIG. 4, the white trace, which is designed on the basis of color temperatures of 3100 K and 5100 K, is designed through an auto white balance (AWB) software algorithm. FIG. 4 is a graph exemplifying color data distributed centering on a white trace in the exemplary white detecting method, wherein the Y axis reflects RG values, and the X axis reflects BG values.

The control unit 170 decides whether the color data information exists in the white area by using the measured distances at step (S225). The white area denotes an area in a predetermined range including the white trace, and information on the white area is set in advance in the digital camcorder. Referring to FIG. 4, the control unit 170 decides that b is color data information in the range of luminance at the area ②, that is, $(n-2)(Y_{max}-Y_{min})/n+Y_{min}$ through $(n-1)(Y_{max}-Y_{min})/n+Y_{min}$, but is out of the white area. However, the control unit 170 decides that the rest of color data information exists in the white area.

If it is decided that the color data information exists in the white area at step (S225), the control unit 170 subdivides the white area at step (S230). Specifically, the control unit 170 subdivides the white area into a plurality of, for example, 5 sub-white areas centering around the white trace while uniformly maintaining intervals between the 5 sub-white areas. If it is decided that the color data information does not exist in the white area at step (S225), the control unit 170 ends the method. As illustrated in FIG. 4, it can be appreciated that on the basis of the white trace, the white area is subdivided into a first sub-white area A, a second sub-white area B, a third sub-white area C, a fourth sub-white area D, and a fifth sub-white area E.

The control unit 170 decides in which of the sub-white areas the color data exists at step (S235). For instance, in the example shown the control unit 170 decides that the first color data information a, which is color data information of the range of luminance at the area ①, and third color data information c, which is color data information of the range of luminance at an area ③ (not shown), exist in the second sub-white area B, decides that the fourth color data information d, which is color data information of the range of luminance at an area ④ (not shown), exists in the fourth sub-white area D, and fifth color data information e, which is color data information of the range of luminance at an area ⑤ (not shown), exists in the third sub-white area C.

The control unit 170 decides a sub-white area, which includes at least one color data information and which is located within a minimum distance from the white trace, as a white detection area at step (S240). As illustrated in FIG. 4, since the second sub-white area B including the first color data information a and the third color data information c is in the sub-white area, which is located within the minimum distance from the white trace, the control unit 170 decides the second sub-white area B as the white detection area.

The control unit 170 decides whether a plurality of color data information exists in the white detection area at step (S245). In FIG. 4, since there is the first color data information a and the third color data information c in the second sub-white area B, the control unit 170 decides that the plurality of color data information exists in the white detection area.

If it is decided that a plurality of color data information exists in the white detection area at step (S245), the control unit 170 detects a color data corresponding to color data information with a higher luminance as a white at step (S250). In FIG. 4, since the first color data information a has a luminance higher than that of the third color date information c, the control unit 170 detects a color data corresponding to the first color data information a as the white.

If it is decided that a plurality of color data information does not exist in the white detection area at step (S245), that is, only one color data exists in the white detection area, the control unit 170 detects the one color data information as a white at step (S255). Specifically, if there is only k-th color data information in the first sub-white area A, the first sub-white area A is decided as the white detection area and the k-th color data information is detected as the white.

As described above, since the color data corresponding to the color data information existing in the sub-white area, which is located within the shortest distance from the white trace among the sub-white areas of the white area, is detected as the white, the white can be detected with comparative accuracy. Also, since a value of the white detected as described above is used, an error probability can be reduced in performing the white balancing.

In FIG. 1, although the image outputting unit 160, the control unit 170 and the storing unit 180 are illustrated as separate from the DSP 150 for clarity and conciseness, in yet other embodiments of the present invention they can be included in the DSP 150.

The exemplary white detecting method as described above is a method of detecting the white by using the luminance division. Hereinafter, an exemplary method of detecting a white by using window division in accordance with an embodiment of the present invention will now be described in greater detail.

Figure 5:
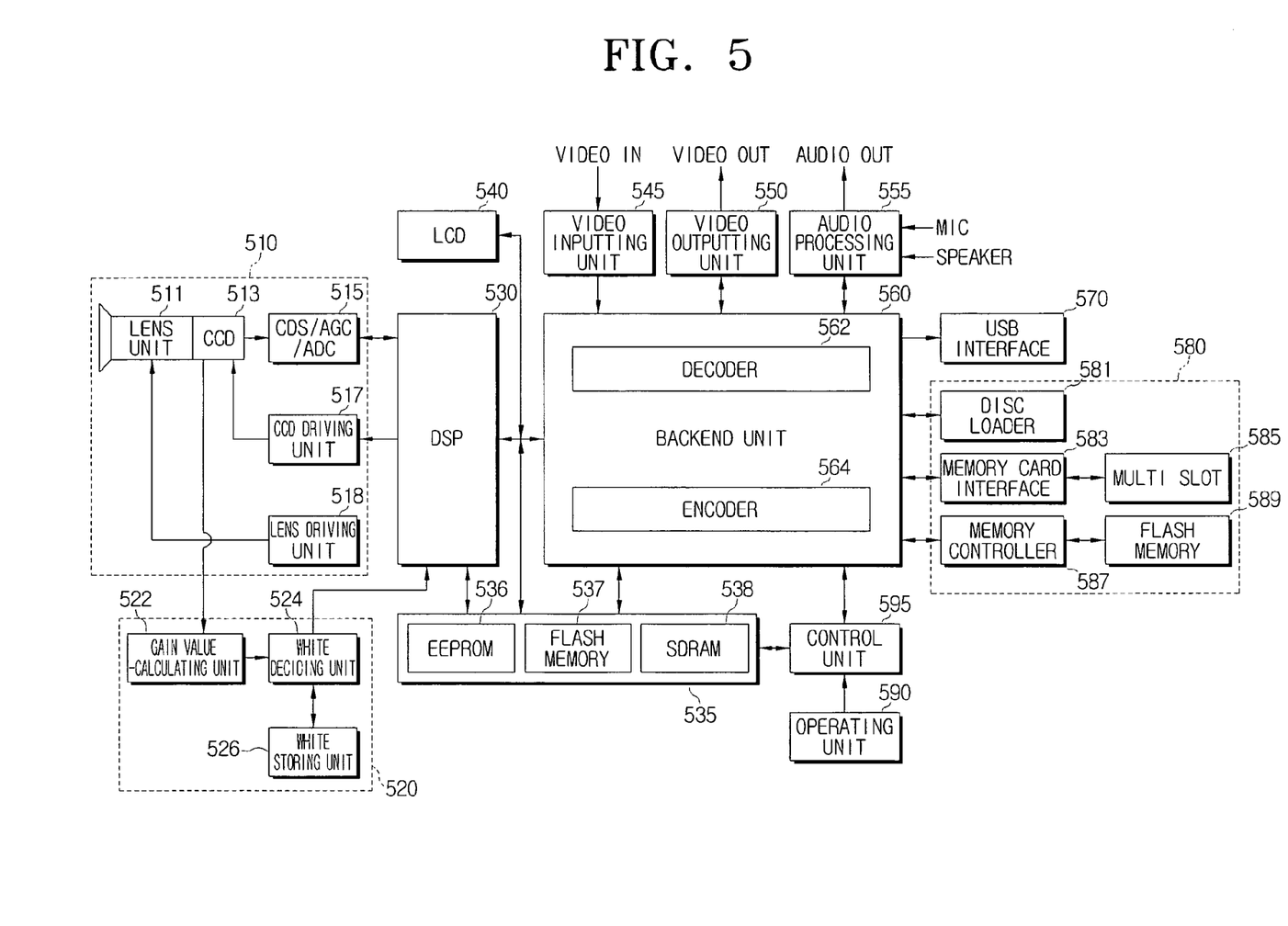
FIG. 5 is a block diagram exemplifying another digital camcorder to which embodiments of the present invention are applicable.

FIG. 5 is a block diagram exemplifying another digital camcorder to which exemplary embodiments of the present invention are applicable and more specifically, illustrates a digital camcorder as compared with FIG. 1.

As illustrated in FIG. 5, the digital camcorder comprises a photographing unit 510, a white detecting unit 520, a digital signal processor (DSP) 530, a storing unit 535, a liquid crystal display (LCD) 540, a video inputting unit 545, a video outputting unit 550, an audio processing unit 555, a backend unit 560, a universal serial bus (USB) interface 570, a recording unit 580, an operating unit 590, and a control unit, such as a microprocessor, 595.

The photographing unit 510 photoelectrically converts optical signals incident thereto through a lens into electric signals, and performs a predetermined signal processing to the electric signals. The photographing unit 510, which performs the functions as described above, includes a lens unit 511, a charged coupled device (CCD) 513, a correlated double sampler/auto gain controller/analog-to-digital converter (CDS/AGC/ADC) 515, a CCD driving unit 517, and a lens driving unit 518.

The lens unit 511 images an optical image of a photographed subject on an optical surface of the CCD 513, as described in greater detail below.

The lens driving unit 518 drives the lens unit 511. Specifically, the lens driving unit 518 drives a zoom motor (not illustrated) to allow the lens unit 511 to zoom in or out, drives a focus motor (not illustrated) to allow the lens unit 511 to adjust a focus, and drives an iris motor (not illustrated) to adjust an amount of opening and shutting of an iris provided in the lens unit 511.

The CCD 513 is driven by the CCD driving unit 517, and is a kind of imaging device which photoelectrically converts an image photographed through the lens unit 511 into electric signals. As described above, the CCD 513 outputs accumulated signals every frame period, that is, 1/30 second, or every field period, that is, 1/60 second. Besides the CCD 513, a complementary metal oxide semiconductor (CMOS) type imaging device may be used in embodying the digital camcorder.

The CDS/AGC/ADC 515 carries out signal processing, such as correlated double sampling, auto gain controlling, A/D converting, and so forth, to the electric signals output from the CCD 513.

The white detecting unit 520 detects a white from the photographed image, and supplies the detected white to the DSP 530. Specifically, the white detecting unit 520 is provided with a gain value-calculating unit 522, a white deciding unit 524 and a white storing unit 526. The gain value-calculating unit 522 divides the image photographed through the lens unit 511 into a plurality of windows, and detects data of R, G and B from each of the windows. The gain value-calculating unit 522 calculates gain values by using the data of R, G and B. As described above, the gain values may be gain values of R and B, or gain values of R, G and B. The gain values are a kind of color data information.

The white deciding unit 524 measures distances between the respective gain values and a white trace, and decides whether each of the gain values are included in a white area.

At this time, the white area may denote an area of predetermined range including a white trace, as described above. However, in the window division, the white area denotes an area in which a white obtained by use of white charts (for example, white papers) according color temperatures exists, and which can be obtained by experiment.

Figure 7:
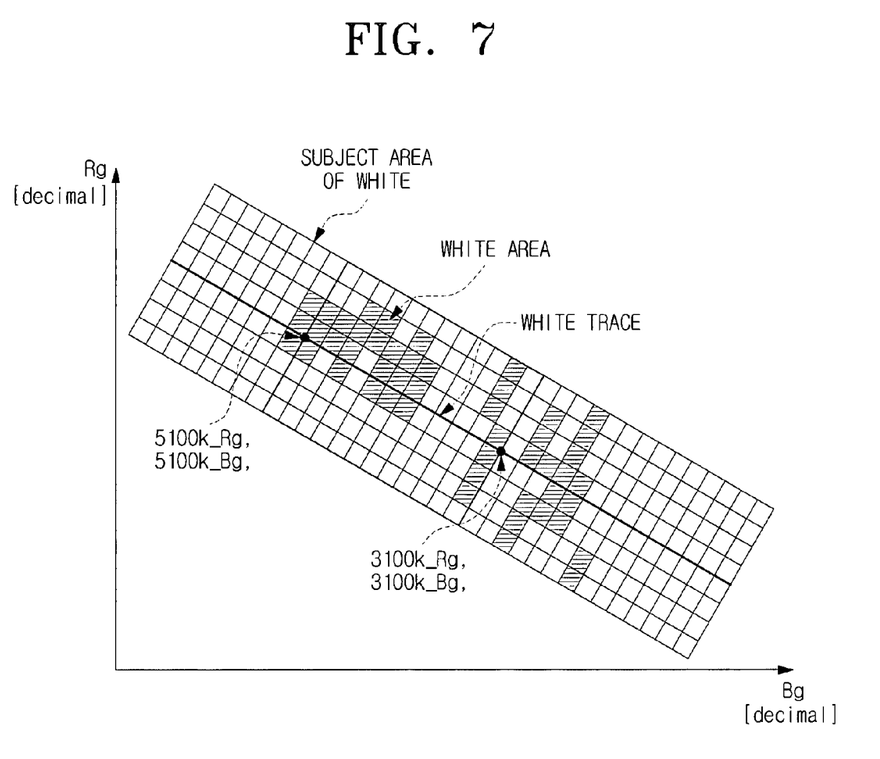
FIG. 7 is a graph exemplifying white areas distributed centering on a white trace in the white detecting method in accordance with another exemplary embodiment of the present invention.

FIG. 7 is a view exemplifying a white area. A designer and the like of the photographing apparatus, that is, the digital camcorder, photographs white charts according to color temperatures (for example, 6500 K, 5100 K, 4500 K, 3700 K, 3100 K and 2600 K) to search a white area. The white area obtained as described above is a hatching area shown in FIG. 7. That is, a subject area of white is areas that are divided centering on the white trace, and the white area is an area including a white detected by using the white charts according to the color temperatures among the subject area of white.

The white deciding unit 524 stores the gain values in the white storing unit 526 if it is decided that the gain values exist in the white area, but does not store the gain values in the white storing unit 526 if it is decided that the gain values do not exist in the white area. After the decision as described above is completed, the white deciding unit 524 reads all of the gain values stored in the white storing unit 526, calculates a mean value of the read gain values, and decides the calculated mean value as a white. The white deciding unit 524 then supplies the mean value to the DSP 530, so that the DSP 530 carries out a white balancing.

The white storing unit 526 preferably stores only the gain values which the white deciding unit 524 decides as existing in the white area. The storing unit 526 preferably removes the gain values stored therein every field period, so that it stores only the gain values of field unit.

The DSP 530 is an element which carries out a signal processing of video signals input from the photographing unit 510 or the video inputting unit 545, and outputs the processed signals to the backend unit 560 and/or the LCD 540.

Specifically, the DSP 530 carries out a format conversion, a digital zoom for adjusting an image scale, an AWB, and a signal processing according to set information, to the video signals output from the photographing unit 510, and outputs the processed signals to the backend unit 560 and/or the LCD 540. The DSP 530 also controls the lens driving unit 518 to carry out an auto focus (AF), an auto exposure (AE), and so forth. Particularly, when the DSP 530 carries out the white balancing, it uses the white received from the white detecting unit 520.

The storing unit 535 stores program information and set information required in controlling the system of the photographing apparatus, and includes an electrically erasable and programmable read only memory (EEPROM) 536, a flash memory 537 and a synchronous dynamic random access memory (SDRAM) 538, but is not limited thereto. The EEPROM 536 is a storing space in which information, for example, set information of the digital camcorder, which is to be maintained in the storing unit 535 even when the power is shut off, is stored. The flash memory 537 is a storing space in which multimedia contents and a program for controlling the backend unit 560 are stored. The SDRAM 538 is a storing space in which data is temporarily backed up. The digital camcorder can also download upgrade programs from other devices connected thereto through a communication line to upgrade programs for control, and store them in the flash memory 537 for use. When the power is shut off, the data stored in the EEPROM 536 and the flash memory 537 is maintained therein, and the data stored in the SDRAM 538 is not maintained.

The LCD 540 comprises a display element on which the video signals output from the backend unit 560 are displayed.

The video inputting unit 545 receives video signals from other devices and transmits them to the DSP 530 and/or the backend unit 560.

The audio processing unit 555 converts analog audio signals input through an audio inputting element, such as a microphone and the like, into digital audio signals, and transmits the converted digital audio signals to the backend unit 560. The audio processing unit 555 also converts digital audio signals output through the backend unit 560 into analog audio signals and outputs the converted analog audio signals to a speaker or other device connected thereto.

The backend unit 560 is an element which carries out a signal processing, such as compression, decompression and reproduction of video signals and/or audio signals. The backend unit 560 is preferably provided with a decoder 562 and an encoder 564.

Specifically, the decoder 562 restores the video signals input from the recording unit 580 or the video inputting unit 545, decompresses the restored video signals to adapt to the display, and outputs the decompressed video signals to the video outputting unit 550 and/or the LCD 540. When the restored images are output to the video outputting unit 550 and/or the LCD 540, the backend unit 560 can carry out an OSD processing to the restored images.

The encoder 564 compresses the video signals input from the DSP 530 and the audio signals input from the audio processing unit 555 in a predetermined format, and transmits a compressed file produced through the compression to the recording unit 580.

In addition, the backend unit 560 transmits a file in the form of a motion picture experts group (MPEG) or a joint photographic experts group (JPEG) format received from the DSP 530 to the recording unit 580, and transmits a file in the form of MPEG or JPEG format received from the recording unit 580 to the DSP 530.

The USB interface 570 provides a USB communication interface between the digital camcorder and a USB device, such as a PC, printer, and so forth. The video outputting unit 550 outputs the video signals output from the backend unit 560 to other devices (for example, a television) connected thereto.

The recording unit 580 records the compressed file output from the backend unit 560 on a recording medium. The recording unit 580 having the function as described above is provided with a disc loader 581, a memory card interface 583, a multi slot 585, a memory controller 587, and a flash memory 589.

The disc loader 581 records the compressed file output from the backend unit 560 on a disc loaded therein. In addition, the disc loader 581 reads a compressed file recorded on the loaded disc and outputs the read file to the backend unit 560. Any number of disc embodiments can be used, including a compact disc (CD), digital versatile disk (DVD), blue-ray disk (BD), high definition (HD)-DVD, and so forth.

The memory card interface 583 records the compressed file input from the backend unit 560 on various memory cards, which are inserted in the multi slot 585.

The memory card interface 583 also reads a compressed file recorded on the loaded memory cards and outputs the read file to the backend unit 560. Any number of memory card embodiments can be used, including a multi media card (MMC), secure digital (SD) card, and so forth.

The memory controller 587 records the compressed file input from the backend unit 560 in the flash memories 589 and 537, which are built-in memories. In addition, the memory controller 587 reads a compressed file recorded on the flash memories 589 and 537 and outputs the read file to the backend unit 560.

The disc, the memory, and the flash memory 589 are a kind of recording medium. Besides the recording media as described above, any number of other recording media embodiments, including an optical recording medium, hard disc drive (HDD) or a dismountable recording medium may be used in embodying the digital camcorder. Also, the recording medium can include a temporary storing area, which temporarily stores an image, and a recording area, which records the image. When the image is recorded on the recording medium, the recording can be carried out in such a manner that the image stored in temporary storing area is recorded in the recording area.

The operating unit 590 receives a user's operating command to transmit to the microprocessor 595, and can be configured such that it is integrally formed with or separated from the digital camcorder. In response to these and other commands, programs and signals, the control unit or microprocessor 595 controls general operations of the digital camcorder.

Figure 6:
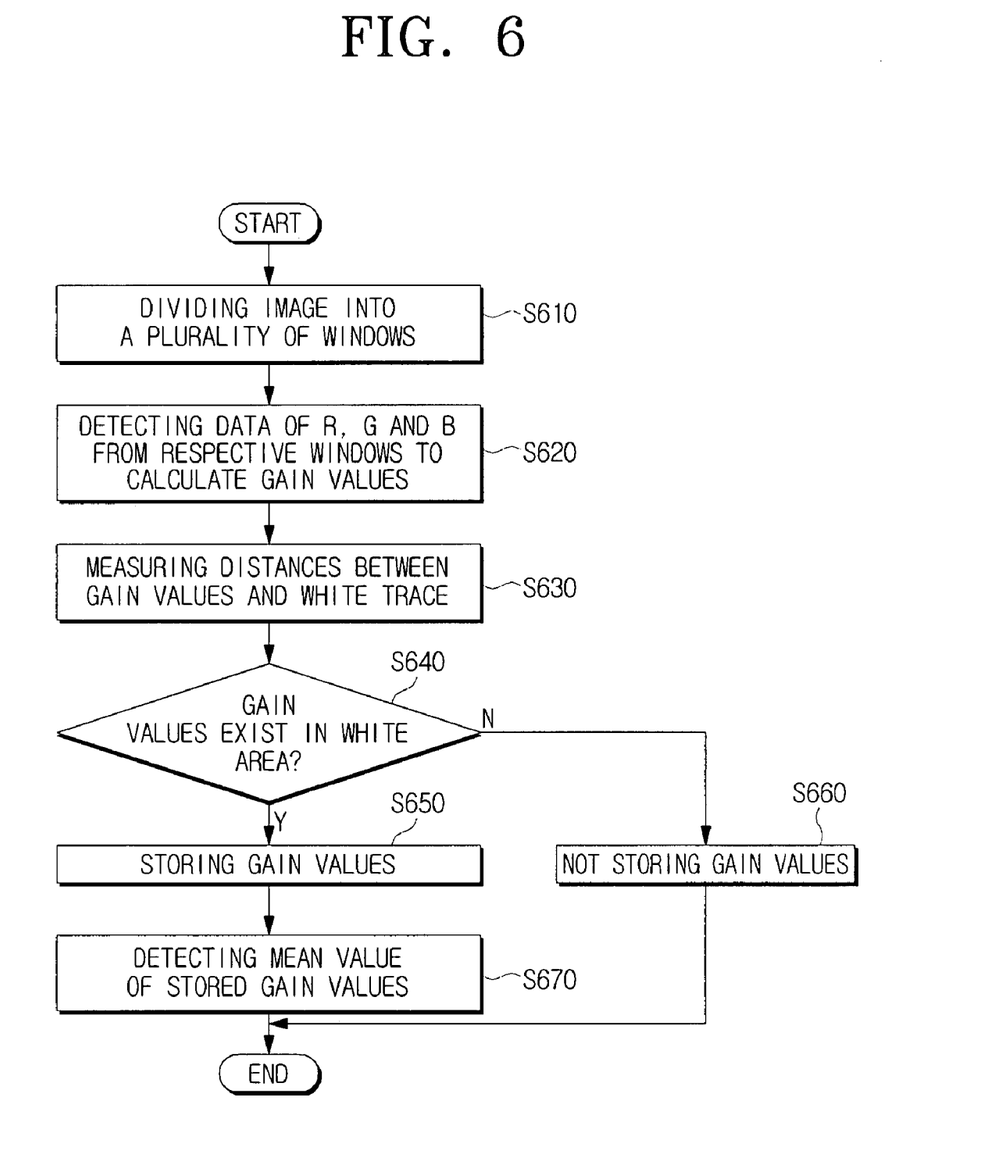
FIG. 6 is a flowchart exemplifying a method of detecting a white by window division in accordance with another exemplary embodiment of the present invention.

Hereinafter, an exemplary method by which the digital camcorder illustrated in FIG. 5 detects a white to perform a white balancing will be explained in greater detail with reference to FIG. 6. FIG. 6 is a flowchart exemplifying a method of detecting the white by the window division in accordance with another exemplary embodiment of the present invention. The exemplary method of the flowchart of FIG. 6 is preferably operated using a field time as a period, but is not limited thereto.

Figure 8A:
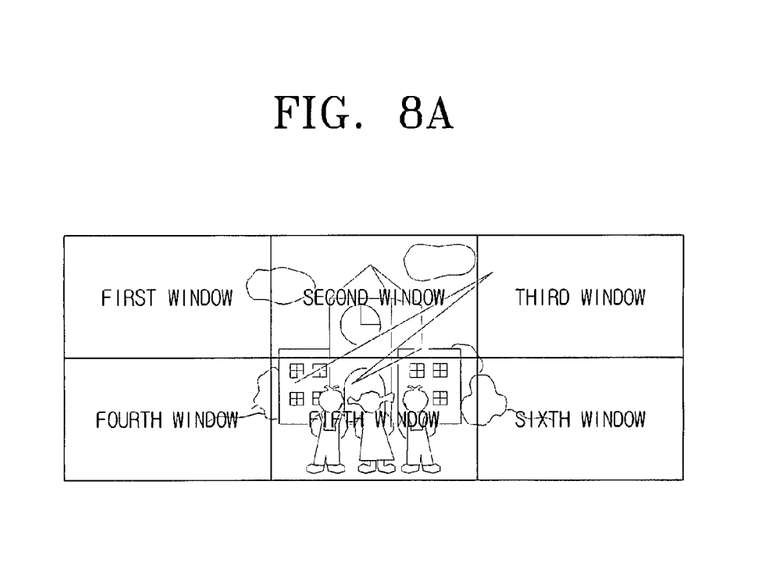
FIGS. 8A and 8B are views further illustrating the exemplary method of FIG. 6.

Referring to FIG. 6, the gain value-calculating unit 522 divides an image into a plurality of windows at step (S610). Specifically, the gain value-calculating unit 522 receives an image photographed through the CCD 513 and divides the image into a plurality of windows. In the window division, it is preferable that the image is evenly divided. However, the extent of division, such as the number of divided windows, may be changed according to whether it can be embodied by the apparatus or whether there is a user's desired setting. In the exemplary embodiment shown, to facilitate the explanation, it is assumed that the image is divided into six windows as illustrated in FIG. 8A.

The gain value-calculating unit 522 detects data of R, G and B from each of the windows to calculate gain values at step (S620). The gain values may include gain values of R, G and B, or for example, only gain values of R and B. The calculated gain values are stored in a temporary storing unit (not illustrated) in the gain value-calculating unit 522.

After the gain values calculated according to the respective windows have been stored, the white deciding unit 524 measures distances between the gain values and a white trace at step (S630). That is, the white deciding unit 524 receives the gain values stored in the gain value-calculating unit 522 one by one to measure the distances between the respective gain values and the white trace. The white trace, which is designed on the base of color temperatures 3100 K and 5100 K, is designed through an AWB software algorithm.

The white deciding unit 524 decides whether the gain values exist in a white area by using the measured distances at step (S640). The white area is an area in which a white obtained by using white charts according to color temperatures exists, as described above. Specifically, a subject area of white denotes an area of predetermined range including the white trace. If the subject area of white is divided into a plurality of areas, a portion of divided areas come within the white area.

Figure 8B:
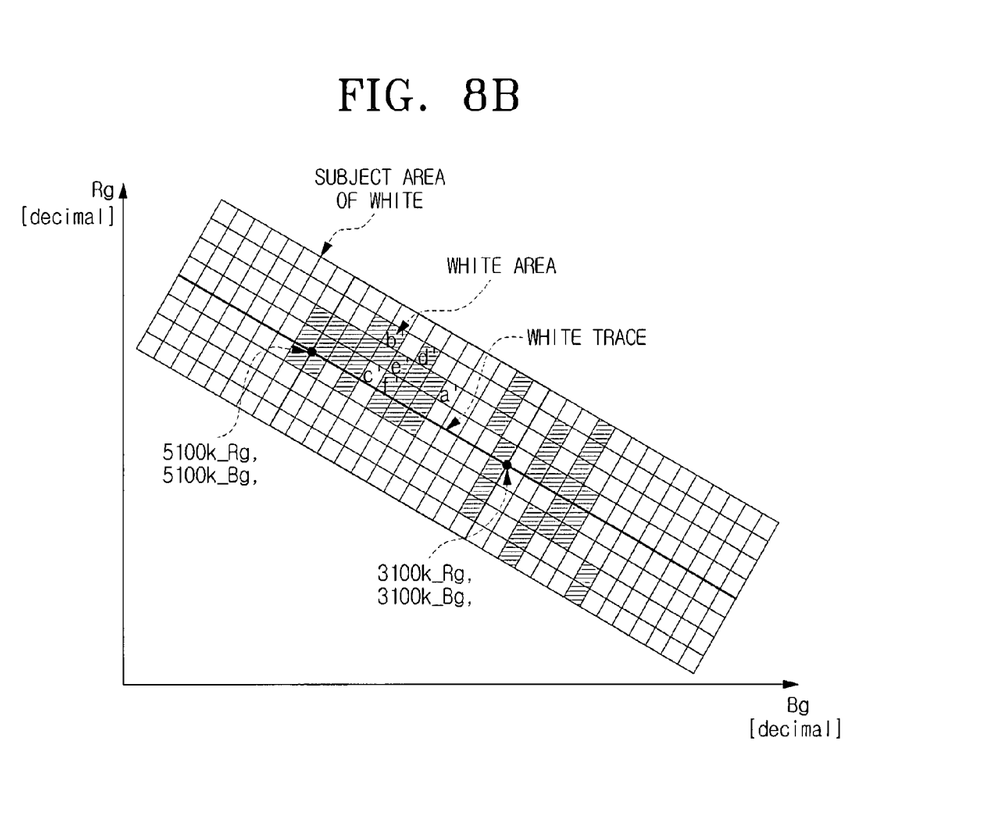

Referring to FIG. 8B, the white deciding unit 524 decides that a gain value (that is for example, a') for data of R, G and B detected from a first window and a gain value (that is for example, c') for data of R, G and B detected from a third window exist outside of the white area. However, the white deciding unit 524 decides that the remaining gain values exist in the white area.

If it is decided that the gain values exist in the white area at step (S640), the white deciding unit 524 stores the gain values in the white storing unit 526 at step (S650). However, if it is decided that the gain values do not exist in the white area at step (S640), the white deciding unit 524 does not store the gain values in the white storing unit 526 at step (S660). To be more specific, the white deciding unit 524 stores the gain values of b', d', e' and f' in the white storing unit 526, and discards the gain values of a' and c'.

Lastly, the white deciding unit 524 reads all of the gain values stored in the white storing unit 526, calculates a mean value of the read gain values, and detects a color data corresponding to the calculated mean value as a white at step (S670). That is, the white deciding unit 524 decides whether the gain values of the respective windows exist in the white area, stores only the gain values existing in the white area in the white storing unit 526, and reads again the gain values stored in the white storing unit 526 to calculate the mean value thereof. As illustrated in FIG. 8B, the mean value of the gain values existing in the white area is e'. Thus, the white deciding unit 524 decides the mean value e' as a white and transmits the decided mean value e' to the DSP 530. The DSP 530 corrects color data by using the transmitted mean value, for example, the gain value of R and B, and thereby outputs color data to which the white balance is adjusted.

As described above, in the window division method, the mean value of the gain values existing in the white area is detected as the white, thereby preventing the white from being frequently changed. Accordingly, when the white is detected, white detection errors are reduced, thereby enhancing a user's satisfaction and guaranteeing product reliability.

Also, in FIG. 5, although the white detecting unit 520 is illustrated as separate from the DSP 530 for clarity and conciseness, in yet other embodiments of the present invention, it can be included in the DSP 530.

Exemplary embodiments of the present invention are applicable to any photographing apparatus which photographs an image and records the photographed image on a recording medium. Namely, embodiments of the present invention are applicable to, for example, a digital camera, a monitoring camera such as a closed-circuit television (CCTV) camera, a mobile phone-embedded camera, and so forth, as well as the digital camcorder explained as an example in the description. Also, embodiments of the present invention are applicable to other photographing apparatus, for example, a photographing apparatus which receives a photographed image and performs an AWB.

As apparent from the foregoing description, according to the exemplary embodiments of the present invention, the white detecting method and the apparatus using the same can accurately detect the white, which forms a reference in color correction, thereby improving a stability of color sense and reducing the error probability in white balancing.

Although representative exemplary embodiments of the present invention have been shown and described in order to exemplify the present invention, the present invention is not limited to the specific exemplary embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A white detecting method for use in performing a white balancing, comprising:
    deciding whether color data information exists in a white area, wherein the white area comprises an area of predetermined range including a white trace; and
    detecting a white by using at least one color data information existing in the white area, wherein the white trace is designed on the basis of color temperatures,
    wherein the deciding step comprises deciding in which of a plurality of sub-white areas subdivided from the white area the color data information exists, and
    the detecting step comprises detecting at least one color data information existing in a sub-white area subdivided from the white area, and which is located within a minimum distance from the white trace, as the white.

2. The method of claim 1, wherein when a plurality of color data information exists in the sub-white area, which is located within the minimum distance from the white trace, a color data information having a greater luminance of the plurality of color data is detected as the white.

3. The method of claim 1, wherein intervals between the sub-white areas are substantially uniform.

4. The method of claim 1, wherein the deciding step comprises deciding whether the color data information exists in the white area by measuring distances between the color data information and the white trace.

5. The method of claim 1, wherein the color data information comprises color data information calculated from respective divided luminances.

6. The method of claim 1, wherein the color data information comprises at least two of gain values of red (R), green (G) and blue (B) colors.

7. A photographing apparatus, comprising:
    a storing unit to store color data information; and
    a control unit to decide whether color data information exists in a white area, wherein the white area comprises an area of predetermined range including a white trace, and to detect a white by using at least one color data information existing in the white area, when detecting the white to perform a white balancing, wherein the white trace is designed on the basis of color temperatures, and
    wherein the control unit is configured to subdivide the white area into a plurality of sub-white areas to decide in which of the sub-white areas the color data information exists, and detect at least one color data information existing in a sub-white area subdivided from the white area, which is located within a minimum distance from the white trace, as the white.

8. The apparatus of claim 7, wherein when a plurality of color data information exists in the sub-white area, which is located within the minimum distance from the white trace, the control unit is configured to detect a color data information having a greater luminance of the plurality of color data as the white.

9. The apparatus of claim 7, wherein intervals between the sub-white areas are substantially uniform.

10. The apparatus of claim 7, wherein the control unit is configured to decide whether the color data information exists in the white area by measuring distances between the color data information and the white trace.

11. The apparatus of claim 7, wherein the color data information comprises color data information calculated from respective divided luminances.

12. The apparatus of claim 7, wherein the color data information comprises at least two of gain values of red (R), green (G) and blue (B) colors.

* * * * *